US012584276B2

(12) United States Patent
Cho et al.

(10) Patent No.: US 12,584,276 B2
(45) Date of Patent: Mar. 24, 2026

(54) ARTIFICIAL TURF STRUCTURE HAVING IMPROVED BUFFERING PERFORMANCE

(71) Applicant: KOLON GLOTECH, INC., Seoul (KR)

(72) Inventors: Kwang Su Cho, Gumi-si (KR); Eun Seon Jeong, Gumi-si (KR); Seung Min Han, Gumi-si (KR); Hyun Joung Jun, Gumi-si (KR); Ki Tae Bae, Daegu (KR); Se Jun Hwang, Gumi-si (KR); Hye In Bang, Gumi-si (KR)

(73) Assignee: KOLONGLOTECH, Seoul (KR)

( * ) Notice: Subject to any disclaimer, the term of this patent is extended or adjusted under 35 U.S.C. 154(b) by 189 days.

(21) Appl. No.: 18/405,923

(22) Filed: Jan. 5, 2024

(65) Prior Publication Data

US 2024/0287747 A1 Aug. 29, 2024

(30) Foreign Application Priority Data

| Feb. 28, 2023 | (KR) | ......................... 10-2023-0027172 |
| Feb. 28, 2023 | (KR) | ......................... 10-2023-0027215 |
| Apr. 28, 2023 | (KR) | ......................... 10-2023-0056392 |

(51) Int. Cl.
| *E01C 13/08* | (2006.01) |
| *B32B 3/12* | (2006.01) |
| *B32B 5/02* | (2006.01) |
| *B32B 5/06* | (2006.01) |

(52) U.S. Cl.
CPC ................ *E01C 13/08* (2013.01); *B32B 3/12* (2013.01); *B32B 5/022* (2013.01); *B32B 5/024* (2013.01); *B32B 5/06* (2013.01); *B32B*

2262/0253 (2013.01); *B32B 2262/0284* (2013.01); *B32B 2307/54* (2013.01); *B32B 2307/56* (2013.01); *B32B 2307/7376* (2023.05)

(58) Field of Classification Search
None
See application file for complete search history.

(56) References Cited

FOREIGN PATENT DOCUMENTS

| CN | 209368626 | * | 9/2019 |
| JP | 2004181075 | A | 7/2004 |
| JP | 2021110173 | * | 8/2021 |
| KR | 20180046852 | * | 5/2018 |
| KR | 20180124580 | * | 11/2018 |
| KR | 20180124580 | A | 11/2018 |
| KR | 102000917 | * | 7/2019 |

OTHER PUBLICATIONS

Machine Translation of JP2021110173 (Year: 2021).*
Machine Translation of KR20180124580 (Year: 2018).*
Machine Translation of CN209368626 (Year: 2019).*
Machine Translation of KR20180046852 (Year: 2018).*
Machine Translation of KR102000917 (Year: 2019).*

* cited by examiner

*Primary Examiner* — Shawn Mckinnon

(57) ABSTRACT

An artificial turf structure includes a protective layer, a buffer layer disposed on a lower surface of the protective layer and having a three-dimensional structure comprising a front surface layer, an intermediate layer and a rear surface layer, a bubble layer disposed on a lower surface of the buffer layer, a pile unit tufted to the protective layer, the buffer layer and the bubble layer, and a backing layer disposed on a lower surface of the bubble layer and preventing the pile unit from leaving.

6 Claims, 4 Drawing Sheets

121, 221, 321

122, 222, 322

123, 223, 323

121, 221, 321

123, 223, 323

ARTIFICIAL TURF STRUCTURE HAVING IMPROVED BUFFERING PERFORMANCE

CROSS-REFERENCE TO RELATED APPLICATION(S)

This U.S. non-provisional application claims priority under 35 USC § 119 to Korean Patent Application Nos. 10-2023-0027172, filed on Feb. 28, 2023, 10-2023-0027215, filed on Feb. 28, 2023, and 10-2023-0056392, filed on Apr. 28, 2023, in the Korean Intellectual Property Office, the disclosures of which are herein incorporated by reference in their entirety.

BACKGROUND

The present disclosure relates to an artificial turf structure having improved buffering performance.

Artificial turf is a man-made grass substitute made from synthetic fibers and has a shape of natural grass. Artificial turf is not limited by the environment, and is relatively easy to maintain. However, depending on conditions of use, artificial turf needs to be brushed periodically due to the loss of filling material and compression of pile yarn and requires refilling of the filling material for maintenance, which is inconvenient.

To solve these problems, unfilled artificial turf using shock-absorbing pads rather than using particle-type fillers has been developed and used. However, the shock-absorbing pads have fatal drawbacks such as permanent compression and low recovery rate due to repeated loading. In addition, the shock-absorbing pads are likely to lose their dimensional stability in width, length, and thickness over time.

Accordingly, there is a need to develop an unfilled artificial turf structure having improved shock absorption.

SUMMARY

Example embodiments provide an artificial turf structure that maintains buffering power for a long period of time and has improved shock-absorbing performance without using filler materials.

Example embodiments provide an artificial turf structure including a protective layer; a buffer layer disposed on a lower surface of the protective layer and having a three-dimensional structure comprising a front surface layer, an intermediate layer and a rear surface layer; a bubble layer disposed on a lower surface of the buffer layer; a pile unit tufted to the protective layer, the buffer layer and the bubble layer; and a backing layer disposed on a lower surface of the bubble layer and preventing the pile unit from leaving.

The protective layer may be formed of woven fabric, non-woven fabric or film, and may have a thickness of 0.2 to 3.5 millimeters (mm).

The front surface layer and the rear surface layer may be formed of a first yarn having a fineness of 120 to 420 denier and a second yarn having a fineness of 200 to 800 denier, respectively.

The front surface layer may have a plurality of grid shapes, and the rear surface layer may have a plurality of honeycomb shapes.

The number of the plurality of grid shapes per 1 m² may be 120,000 to 200,000, and the number of the plurality of honeycomb shapes per 1 m² may be 35,000 to 60,000.

The intermediate layer may connect the front surface layer and the rear surface layer to each other, and may be formed of a third yarn having a fitness of 180 to 800 denier.

The buffer layer may have a thickness of 5 to 20 mm.

The pile unit may include a first pile yarn and a second pile yarn, and the first pile yarn and the second pile yarn may be turfed while overlapping each other.

The pile unit may include a portion exposed onto a surface of the protective layer, and the exposed portion may have a length of 10 to 60 mm.

DETAILED DESCRIPTION

Hereinafter, example embodiments of the present disclosure will be described in more detail so that those skilled in the art can easily implement it. However, the present disclosure can be implemented in various forms and is not limited to the example embodiments described in this specification.

In the present disclosure, when terms such as "about," "approximately," or similar expressions such as "at least" are used in relation to numerical values, theoretical, experimental, statistical, or empirical error of ±10%, ±7%, ±5%, ±3%, ±2%, or ±1% is intended to be acceptable with respect to a corresponding numerical value.

Figure 1:
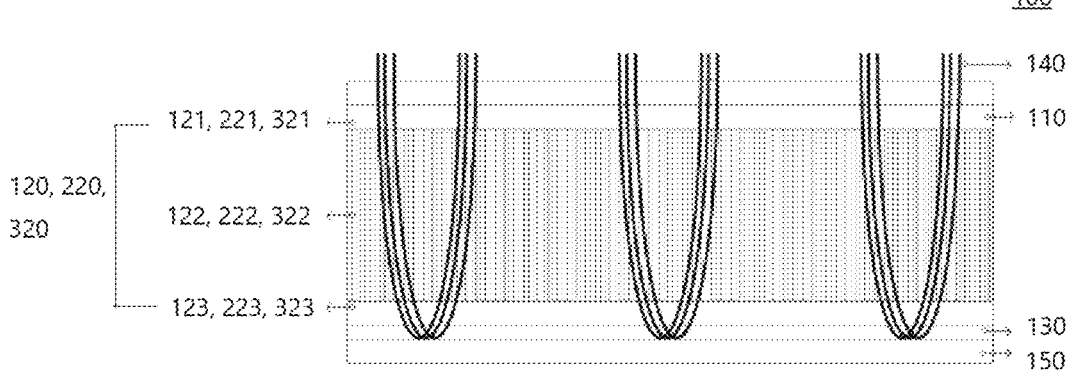
FIG. 1 is a diagram illustrating an artificial turf structure according to an example embodiment of the present disclosure.

FIG. 1 is a diagram illustrating an artificial turf structure according to an example embodiment of the present disclosure. Referring to FIG. 1, the artificial turf structure the according to the example embodiment of the present disclosure includes a protective layer; a buffer layer disposed on a lower surface of the protective layer and having a three-dimensional structure including a front surface layer, an intermediate layer, and a rear surface layer; a bubble layer disposed on a lower surface of the buffer layer; a pile unit tufted to the protective layer, the buffer layer and the bubble layer; and a backing layer disposed on a lower surface of the bubble layer and preventing the pile unit from leaving.

In the present disclosure, the protective layer 110 is provided to prevent foreign objects from entering the buffer layer 120, and may be in the form of woven fabric, non-woven fabric, or film, and preferably may be in the form of woven fabric. Additionally, the protective layer 110 may include a UV stabilizer, etc. depending on the intended use.

In addition, a thickness of the protective layer 110 may be 0.2 to 3.5 mm, preferably 0.4 to 2.5 mm, and more preferably about 1.25 mm. When the thickness of the protective layer 110 is less than the above-mentioned lower limit, it may be difficult to prevent foreign objects from entering the buffer layer 120. When the thickness of the protective layer 110 exceeds the above-mentioned upper limit, it may be difficult to tuft the pile unit.

Figure 2:
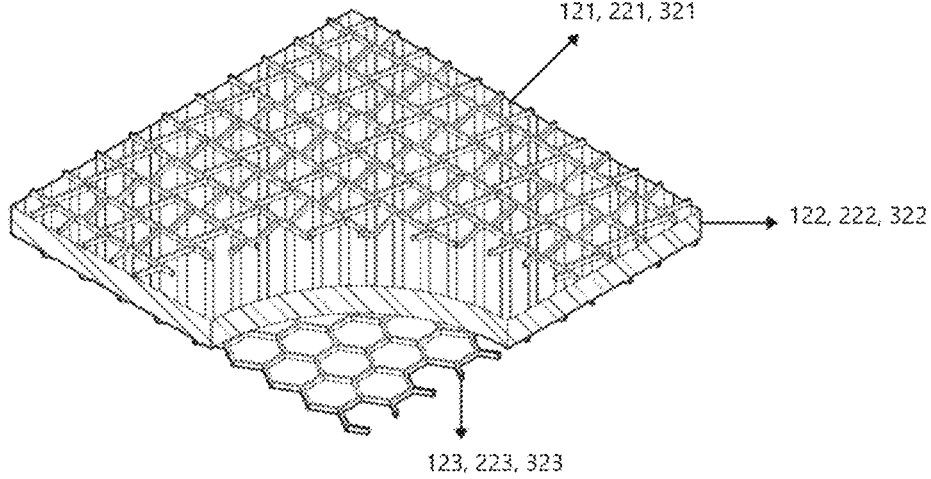
FIG. 2 is a diagram illustrating a buffer layer of FIG. 1.
Figure 3:
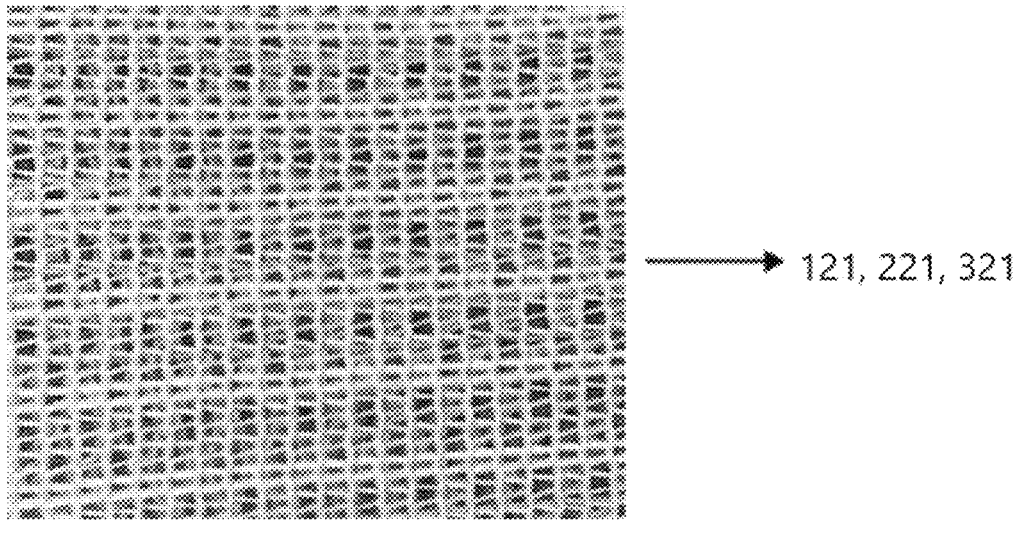
FIG. 3 is an actual image of a front surface layer of a buffer layer according to an example embodiment of the present disclosure.
Figure 4:
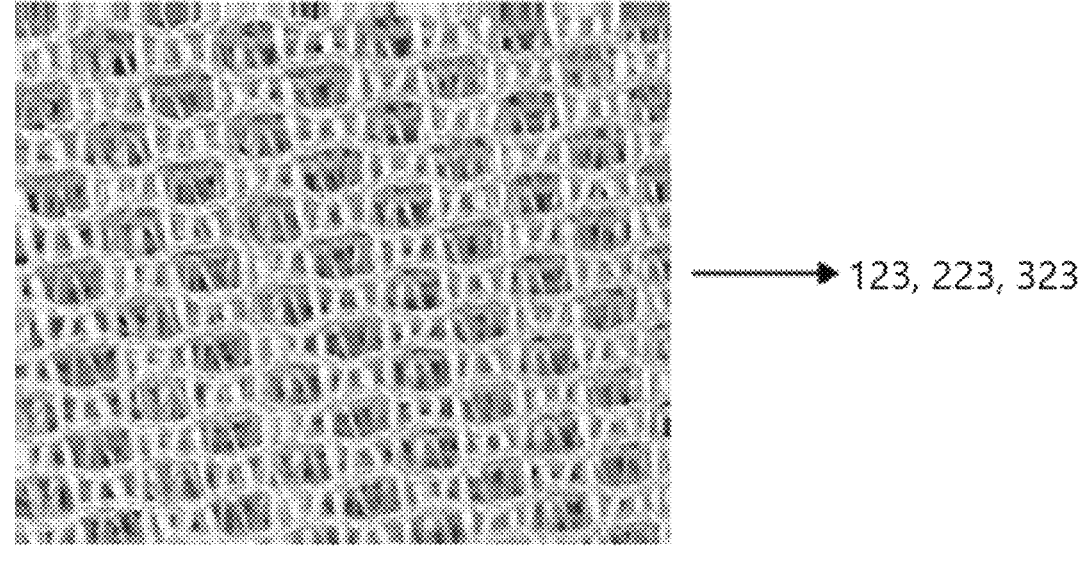
FIG. 4 is an actual image of a rear surface layer of a buffer layer according to an example embodiment of the present disclosure.

FIG. 2 is a diagram illustrating a buffer layer of FIG. 1, FIG. 3 is an actual image of a front surface layer of a buffer layer according to an example embodiment of the present disclosure, and FIG. 4 is an actual image of a rear surface layer of a buffer layer according to an example embodiment of the present disclosure.

Referring to FIG. 2, the buffer layer 120 may include the front surface layer 121, the intermediate layer 122, and the rear surface layer 123, and may have a three-dimensional structure with a space therein, resulting in improved elastic recovery and improved water drainage.

In addition, in the present disclosure, the buffer layer 120 is provided to improve shock-absorbing performance of the artificial turf structure 100, and may be prepared from one or more types of fibers selected from the group consisting of polyethylene terephthalate, polybutylene terephthalate, polytrimethylene terephthalate, polyamide, polyethylene, polypropylene and acrylic.

In addition, first to third yarns constituting the front surface layer 121, the rear surface layer 123, and the intermediate layer 122 may be fibers of the same material or different materials.

In the present disclosure, a thickness of the buffer layer 120 may be 5 to 20 mm, and preferably 8 to 12 mm. The above range is preferable due to improved shock-absorbing performance, durability, or the like, exhibited within it.

Referring to FIG. 3, in the present disclosure, the front surface layer 121 is disposed below the protective layer 110. The front surface layer 121 is provided to protect the intermediate layer 122 from being damage caused by external force. The front surface layer 121 may be formed of a first yarn with a fineness of 120 to 420 denier and a second yarn with a fineness of 200 to 800 denier. Preferably, the front surface layer 121 may be formed of a first yarn with a fineness of 150 to 400 denier and a second yarn with a fineness of 250 to 750 denier. When each of the first and second yarns constituting the front surface layer 121 has fineness less than the above-mentioned lower limit, the front surface layer 121 and the rear surface layer 123 may be damaged during tufting, and when the fineness exceed the above-mentioned upper limit, it may be difficult to tuft the pile unit 140, leading to a decrease in workability.

In addition, the front surface layer 121 may include 30 to 70 weight % of the first yarn and 30 to 70 weight % of the second yarn, and preferably include 45 to 55 weight % of the first yarn and 45 to 55 weight % of the second yarn. When the weight % of the first yarn is less than the above-mentioned lower limit, the front surface layer 121 and the rear surface layer 123 may be damaged during tufting, and when it exceeds the above-mentioned upper limit, it may be difficult to tuft the pile unit 140, leading to a decrease in workability.

In the present disclosure, the front surface layer 121 may be formed of a plurality of grid shapes. 120,000 to 200,000 grid shapes may be formed per 1 m², and preferably 137,000 to 165,000 grid shapes may be formed per 1 m². When the number of the grid shapes is less than the above-mentioned lower limit per 1 m², durability of the buffer layer 120 may be decreased, and when the durability exceeds the above-mentioned upper limit per 1 m², it may be difficult to tuft the pile unit 140, and the shock-absorbing performance of the buffer layer 120 may be reduced.

Referring to FIG. 4, the rear surface layer 123 is provided to protect the intermediate layer 122 from damage caused by external force. The rear surface layer 123 may be formed of a first yarn with a fineness of 120 to 420 denier and a second yarn with a fineness of 200 to 800 denier. Preferably, the front surface layer 121 may be formed of a first yarn with a fineness of 150 to 400 denier and a second yarn with a fineness of 250 to 750 denier. When the fineness of the first and second yarns constituting the rear surface layer 123 are less than the above-mentioned lower limit, the front surface layer 121 and the rear surface layer 123 may be damaged during tufting, and when the fineness exceed the above-mentioned upper limit, it may be difficult to tuft the pile unit 140, leading to a decrease in workability.

In addition, the rear surface layer 123 may include 30 to 70 weight % of the first yarn and 30 to 70 weight % of the second yarn, and preferably include 45 to 55 weight % of the first yarn and 45 to 55 weight % of the second yarn. When the weight % of the first yarn is less than the above-mentioned lower limit, the front surface layer 121 and the rear surface layer 123 may be damaged during tufting, and when it exceeds the above-mentioned upper limit, it may be difficult to tuft the pile unit 140, leading to a decrease in workability.

In the present disclosure, the rear surface layer 123 may be formed of a plurality of honeycomb shapes. 35,000 to 60,000 honeycomb shapes may be formed per 1 m², and preferably 40,000 to 55,600 honeycomb shapes may be formed per 1 m². When the number of the honeycomb shapes is less than the above-mentioned lower limit per 1 m², the durability of the buffer layer 120 may be decreased, and when it exceeds the above-mentioned upper limit per 1 m², it may be difficult to tuft the pile unit 140, and the shock-absorbing performance of the buffer layer 120 may be reduced.

In the present disclosure, the front surface layer 121 may be formed in a grid shape and the rear surface layer 123 may be formed in a honeycomb shape, and thus the artificial turf structure 100 may satisfy Korean Industrial Standards (KS) for shock-absorbing rate of 50% or more and vertical deformation of 3 to 10 mm.

In the present disclosure, the intermediate layer 122 is disposed between the front surface layer 121 and the rear surface layer 123. The intermediate layer 122 is provided to connect the front surface layer 121 and the rear surface layer 123, improve the shock-absorbing performance of the buffer layer 120. The intermediate layer 122 may be formed of a third yarn with a fineness of 180 to 800 denier, and preferably may be formed of a third yarn with a fineness of 210 to 750 denier. The third yarn may be a mono yarn. When the fineness of the third yarn forming the intermediate layer 122 is less than the above-mentioned lower limit, the permanent compression rate may be reduced, and when the fineness exceeds the above-mentioned upper limit, it may be difficult to tuft the pile unit 140, leading to a decrease in workability.

In addition, the front surface layer 121 and the rear surface layer 123 may be connected by regularly or irregularly connecting opposite ends of the third fiber to the front surface layer 121 and the rear surface layer 123 by straight or diagonal lines, or by stacking the third fiber.

Additionally, in the present disclosure, a commercially available 3D spacer fabric product may be applied to the buffer layer 120.

Additionally, in the present disclosure, the bubble layer 130 may be disposed on a lower surface of the rear surface layer 123, and may serve to provide shape stability of the artificial turf structure 100 and to securely seat and fix the pile unit 140. The bubble layer 130 may be formed of a woven or non-woven fabric of one or more fibers selected from the group consisting of polyolefin, polyethylene terephthalate, polyvinylidene chloride, and nylon, preferably polyethylene terephthalate non-woven fabric. The non-woven fabric may be prepared by one or more methods selected from the group consisting of a spunbond method, a melt brown method, a needle punching method and spunlace method.

In the present disclosure, the pile unit 140 may include a plurality of pile yarns and may be tufted to the protective layer 110, the buffer layer 120, and the bubble layer 130. The tufted pile unit 140 may be exposed on the surface of the protective layer 110 through the bubble layer 130, the buffer layer 120 and the protective layer 110.

A length of the exposed pile unit 140 may be 10 to 60 mm, and preferably 30 to 55 mm. When the length of the exposed pile unit 140 is less than the above-mentioned lower limit, the shock-absorbing performance of the artificial turf structure 100 may be decreased, and when it exceeds the above-mentioned upper limit, it may be difficult to maintain shape stability.

In the present disclosure, the fineness of the plurality of pile yarns may be 500 to 3,000 denier, preferably 650 to 2,700 denier. The pile yarns may be mono yarns. The material of the pile yarns may be one or more pile yarns selected from the group consisting of polyethylene, polypropylene, polyamide, polyethylene terephthalate, polybutylene terephthalate and polytrimethylene terephthalate.

In the present disclosure, the backing layer 150 may be disposed on a lower surface of the bubble layer 130, and may be provided to prevent the pile yarns from leaving. The backing layer 150 may be formed of one or more woven or non-woven fibers selected from the group consisting of polyolefin, polyethylene terephthalate, polyvinylidene chloride and nylon. Preferably The backing layer 150 may be formed of a polyethylene terephthalate non-woven fabric. The non-woven fabric may be prepared by any method selected from the group consisting of a spunbond method, a melt brown method, a needle punching method and a spunlace method.

The artificial turf structure 100 according to another example embodiment of the present disclosure includes the protective layer 110; the buffer layer 220 disposed on a lower surface of the protective layer 110 and having a three-dimensional structure including the front surface layer 221, the intermediate layer 222 and the rear surface layer 223; the bubble layer 130 disposed on a lower surface of the buffer layer 220; the pile unit 140 tufted to the protective layer 110, the buffer layer 220 and the bubble layer 130; and the backing layer 150 disposed on a lower surface of the bubble layer 130 and preventing the pile unit 140 from leaving.

Except for the description provide below, contents regarding the protective layer 110, the front surface layer 221, the intermediate layer 222 and the rear surface layer 223, the bubble layer 130, the pile unit 140 and the backing layer 150 are the same as those of the protective layer 110, the front surface layer 121, the intermediate layer 122, the rear surface layer 123, the bubble layer 130, the pile unit 140 and the backing layer 150 described above.

In the present disclosure, the buffer layer 220 is impregnated with an elastic material. The buffer layer 220 has better shock-absorbing performance and durability than a buffer layer that is not impregnated with an elastic material. The elastic material may be at least one material selected from the group consisting of polyurethane resin, polyvinyl acetate resin, styrene-based polymer resin, natural rubber, EPDM (Ethylene-Propylene Diene Monomer) rubber, acrylic rubber, butyl rubber, and silicone rubber. Preferably the elastic material may be polyurethane resin.

Specifically, styrene-based polymer resin may be one or more types selected from the group consisting of styrene-ethylene-butadiene-styrene copolymer, styrene-butadiene-styrene copolymer, styrene-ethylene-propylene-styrene copolymer, hydrogenated styrene-isoprene-butadiene copolymer, and styrene-isoprene-styrene copolymer.

Acrylic rubber is may be a polymer of the monomer selected from the group consisting of methyl acrylate, ethyl acrylate, n-propyl acrylate, n-butyl acrylate, 2-ethylhexyl acrylate, hexyl methacrylate, 2-ethylhexyl methacrylate and mixtures thereof.

Butyl rubber may be a copolymer of isobutylene and isoprene (IIR), bromobutyl rubber, etc.

In the present disclosure, the content of the elastic material impregnated in the buffer layer 220 may be 10 to 50 weight %, preferably 20 to 40 weight %, based on the total weight % of the buffer layer 220. The content of the elastic material impregnated in the buffer layer 220 may be measured by the following method.

The buffer layer 220 is prepared by impregnating the buffer layer 220 with the elastic material and drying it at 80-100° C. for 2 hours. Afterwards, the content of the elastic material is calculated using Equation 1 below.

$$[\text{Equation 1}]$$

$$\text{Content of Elastic Material (weight \%)} =$$

$$\frac{(\text{Weight of Substrate Impregnated with Elastic Material} - \text{Weight of Substrate}) \times 100}{\text{Weight of Substrate}}$$

In the present disclosure, when the content of the elastic material included in the buffer layer 220 is less than the above-described lower limit, the degree of improvement in shock-absorbing power is not significant, and when it exceeds the above-mentioned upper limit, tufting is not easy, and voids in the buffer layer 220 are excessively reduced, so the improvement in shock-absorbing performance compared to the elastic material is not significant. Therefore, the above-mentioned range is preferable.

In the present disclosure, a density of the front surface layer 221 may be 0.05 to 0.4 g/cm³, a density of the intermediate layer 222 may be 0.01 to 0.1 g/cm³, and a density of the rear surface layer 223 may be 0.1 to 0.4 g/cm³. Preferably, a density of the front surface layer 221 may be 0.1 to 0.3 g/cm³, the density of the intermediate layer 222 may be 0.02 to 0.05 g/cm³, and a density of the rear surface layer 223 may be 0.1 to 0.3 g/cm³. When the densities of the front surface layer 221, intermediate layer 222 and rear surface layer 223 are less than the above-mentioned lower limit, shock-absorbing performance may be reduced, and when they exceed the above-mentioned upper limit, tufting of the pile yarn is not easy, and the elastic material impregnation may be difficult.

The artificial turf structure 100 according to another example embodiment of the present disclosure includes the protective layer 110; the buffer layer 320 disposed on a lower surface of the protective layer 110 and having a three-dimensional structure including the front surface layer 321, the intermediate layer 322 and the rear surface layer 323; the bubble layer 130 disposed on a lower surface of the buffer layer 320; the pile unit 140 tufted to the protective layer 110, the buffer layer 320 and the bubble layer 130; and the backing layer 150 disposed on a lower surface of the bubble layer 130 and preventing the pile unit 140 from leaving. The buffer layer 320 may be prepared by forming the buffer layer 320 having a three-dimensional structure; and heating the buffer layer 320.

Except for the description provide below, contents regarding the protective layer 110, the front surface layer 321, the intermediate layer 322 and the rear surface layer 323, the bubble layer 130, the pile unit 140 and the backing layer 150 are the same as those of the protective layer 110, the front surface layer 121, the intermediate layer 122, the rear surface layer 123, the bubble layer 130, the pile unit 140 and the backing layer 150 described above.

In the present disclosure, the buffer layer 320 may be prepared by forming the buffer layer 320 having a three-dimensional structure; and heating the buffer layer 320. The heating of the buffer layer 320 may be performed at a temperature of 130 to 170° C. for 5 to 60 seconds at a speed of 2 to 5 m/min, preferably at a temperature of 140 to 160° C. for 10 to 30 seconds at a speed of 2.5 to 4 m/min. In the heating process, when the temperature is less than 130° C., the elastic recovery may be reduced due to poor bonding of the buffer layer 320, and when it exceeds 170° C., the elastic recovery may be excellent, but production efficiency may be reduced due to high preparing costs.

In addition, when the speed is less than 2 m/min, elastic recovery may be improved, but production efficiency is reduced. When the speed exceeds 5 m/min, the elastic recovery power may be reduced due to poor bonding of the buffer layer 320. In addition, when the heating time is less than 5 seconds, the elastic recovery may be reduced due to poor bonding of the buffer layer 320. When the heating time exceeds 60 seconds, elastic recovery may be improved, but production efficiency may be reduced due to high preparing costs.

In addition, the heating time refers to the time during which the prepared buffer layer 320 is heated within the heating device, and specifically refers to a difference between when one end of the buffer layer 320 enters and exits the heating device.

In the present disclosure, the weight per unit area of the front surface layer 321 may be 150 to 450 g/m², the weight per unit area of the intermediate layer 322 may be 1,700 to 2,300 g/m², and the weight per unit area of the rear surface layer 323 may be 300 to 600 g/m². Preferably, the weight per unit area of the front surface layer 321 is 200 to 400 g/m², the weight per unit area of the intermediate layer 322 is 1,900 to 2,100 g/m², and the weight per unit area of the rear surface layer 323 is 400 to 500 g/m². When the weight per unit area of the front surface layer 321, the intermediate layer 322, and the rear surface layer 323 are less than 150 g/m², 1,700 g/m², and 300 g/m², respectively, the elastic recovery may be reduced. When the weight per unit area of the front surface layer 321, the intermediate layer 322, and the rear surface layer 323 exceed 450 g/m², 2,300 g/m², and 600 g/m², respectively, the shock-absorbing rate may be decreased.

A method of preparing the artificial turf structure 100 according to an example embodiment of the present disclosure includes a) preparing the buffer layer 320 having a three-dimensional structure; b) heating the buffer layer 320 at a temperature of 130 to 170° C. for 10 to 30 seconds at a speed of 2 to 5 m/min; c) placing the protective layer 110, the buffer layer 320 and the bubble layer 130, then tufting the pile unit 140; and d) placing the backing layer 150 on a lower surface of the bubble layer 130 and heating it at a temperature of 140 to 180° C. for 5 to 60 seconds at a speed of 2 to 5 m/min.

Except for the description provide below, contents regarding the protective layer 110, the front surface layer 321, the intermediate layer 322 and the rear surface layer 323, the bubble layer 130, the pile unit 140 and the backing layer 150 are the same as those of the protective layer 110, the front surface layer 121, the intermediate layer 122, the rear surface layer 123, the bubble layer 130, the pile unit 140 and the backing layer 150 described above.

Operation a) is an operation of preparing the buffer layer 320 having a three-dimensional structure, and Operation b) is an operation of preparing the buffer layer 320 by heating and bonding the prepared buffer layer 320 having the three-dimensional structure. Heating in Operation b) may preferably be performed using a steam dryer, and the heating conditions are the same as previously described.

The heating time refers to the time during which the prepared buffer layer 320 is heated within the heating device, and specifically refers to a difference between when one end of the buffer layer 320 enters and exits the heating device.

In addition, Operation c) is an operation of placing the protective layer 110, the buffer layer 320 and the bubble layer 130, and tufting the pile unit 140. The tufting may be used without limitation as long as it is a widely known method in the art.

In the present disclosure, Operation d) is an operation of placing the backing layer 150 on a lower surface of the bubble layer 130 and heating the placed backing layer 150 to heat-fuse the pile unit 140 and to secondarily bond the buffer layer 320, thereby improving the elastic recovery of the buffer layer 320.

In Operation d), the heating may be performed at a temperature of 140 to 180° C. for 5 to 60 seconds at a speed of 2 to 5 m/min, preferably at a temperature of 150 to 170° C. for 10 to 30 seconds at a speed of 2.5-4 m/min. When the temperature is less than 140° C., the speed is less than 2 m/min or the heating time is less than 5 seconds, the pullout strength may be reduced due to poor fusion of the pile unit 140, and the elastic recovery of the artificial turf structure 100 may be reduced due to poor bonding of the buffer layer 320. When the temperature exceeds 180° C., the speed exceeds 5 m/min or the heating time exceeds 60 seconds, the elastic recovery may be improved, but the pile unit 140 may be excessively fused, resulting in a decrease in shape stability, and the first to third yarns, and the pile unit may melt, resulting in a decrease in appearance quality.

The heating time refers to the time during which the prepared artificial turf structure is heated within the heating device, and specifically refers to a difference between when one end of the artificial turf structure enters and exits the heating device.

Hereinafter, preferred embodiments of the present disclosure will be described in detail.

Buffer Layer Preparing Example 1

A three-dimensional structure including a front surface layer, an intermediate layer, and a rear surface layer and having a thickness of 10 mm was prepared using double-raschel machine. The front surface layer, the intermediate layer, and the rear surface layer had thicknesses of 2 mm, 6 mm, and 2 mm, respectively. The front surface layer and the rear surface layer were each formed of a first yarn and a second yarn. The first yarn was 50 weight % of 150 denier polyethylene terephthalate. The second yarn was 50 weight % of 250 denier polyethylene terephthalate. The intermediate layer was formed of a third yarn (mono yarn) of 210 denier polyethylene terephthalate. The front surface layer was formed to have about 160,000 grid shapes per 1 m², and the rear surface layer was formed to have about 54,500 honeycomb shapes per 1 m².

Buffer Layer Preparing Example 2

The buffer layer was prepared in the same manner as Buffer Layer Preparing Example 1, except that the denier of the polyethylene terephthalate of the second yarn consisting the front surface layer and the rear surface layer, was changed to 300.

Buffer Layer Preparing Example 3

The buffer layer was prepared in the same manner as Buffer Layer Preparing Example 1, except that the denier of the polyethylene terephthalate of the second yarn consisting the front surface layer and the rear surface layer, was changed to 750.

Buffer Layer Preparing Example 4

The buffer layer was prepared in the same manner as Buffer Layer Preparing Example 1, except that the denier of the polyethylene terephthalate of the first yarn consisting the front surface layer and the rear surface layer, was changed to 400.

Buffer Layer Preparing Example 5

The buffer layer was prepared in the same manner as Buffer Layer Preparing Example 1, except that the denier of the polyethylene terephthalate of the first yarn and the second yarn were changed to 400 and 300, respectively. The first yarn and the second yarn formed the front surface layer and the rear surface layer.

Buffer Layer Preparing Example 6

The buffer layer was prepared in the same manner as Buffer Layer Preparing Example 1, except that the denier of the polyethylene terephthalate of the first yarn and the second yarn were changed to 400 and 750, respectively. The first yarn and the second yarn formed the front surface layer and the rear surface layer.

Buffer Layer Preparing Example 7

The buffer layer was prepared in the same manner as Buffer Layer Preparing Example 1, except that the denier of the polyethylene terephthalate of the first yarn, the second yarn and the third yarn were changed to 400, 750 and 450, respectively. The first yarn and the second yarn formed the front surface layer and the rear surface layer, and the third yarn (mono yarn) formed the intermediate layer.

Buffer Layer Preparing Example 8

The buffer layer was prepared in the same manner as Buffer Layer Preparing Example 1, except that the denier of the polyethylene terephthalate of the first yarn, the second yarn and the third yarn were changed to 400, 750 and 750, respectively. The first yarn and the second yarn formed the front surface layer and the rear surface layer, and the third yarn (mono yarn) formed the intermediate layer.

Buffer Layer Preparing Example 9

A three-dimensional structure including a front surface layer, an intermediate layer, and a rear surface layer and having a thickness of 10 mm was prepared using double-raschel machine. The front surface layer, the intermediate layer, and the rear surface layer had thicknesses of 1 mm, 8 mm, and 1 mm, respectively.

The front surface layer and the rear surface layer were each formed of fibers having 50 weight % of 150 denier polyethylene terephthalate and 50 weight % of 250 denier polyethylene terephthalate. The intermediate layer was formed of polyethylene terephthalate fibers (mono yarn) having a diameter of approximately 0.27 mm. The front surface layer was formed to have about 160,000 grid shapes per 1 m² and the rear surface layer was formed to haver about 47,500 honeycomb shapes per 1 m². In addition, densities of the front surface layer, the intermediate layer and the rear surface layer were about 0.22 g/cm³, 0.025 g/cm³ and 0.22 g/cm³, respectively.

After impregnating the prepared three-dimensional structure with polyurethane resin, it was dried at 80-100° C. for about 2 hours. The content of elastic material based on the following Equation 1 was about 30 weight %.

$$[\text{Equation 1}]$$

$$\text{Content of Elastic Material (weight \%)} =$$

$$\frac{(\text{Weight of Substrate Impregnated with Elastic Material} - \text{Weight of Substrate}) \times 100}{\text{Weight of Substrate}}$$

Buffer Layer Preparing Example 10

A three-dimensional structure including a front surface layer, an intermediate layer, and a rear surface layer and having a thickness of 10 mm was prepared using double-raschel machine. The front surface layer, the intermediate layer, and the rear surface layer had thicknesses of 1 mm, 8 mm, and 1 mm, respectively.

The front surface layer and the rear surface layer were each formed of fibers having 50 weight % of 150 denier polyethylene terephthalate and 50 weight % of 250 denier polyethylene terephthalate. The intermediate layer was formed of polyethylene terephthalate fibers (mono yarn) having a diameter of approximately 0.27 mm. The front surface layer was formed to have about 160,000 grid shapes per 1 m² and the rear surface layer was formed to haver about 47,500 honeycomb shapes per 1 m². In addition, densities of the front surface layer, the intermediate layer and the rear surface layer were about 0.22 g/cm³, 0.025 g/cm³ and 0.22 g/cm³, respectively.

After impregnating the prepared three-dimensional structure with polyurethane resin, it was dried at 80-100° C. for about 2 hours. The content of elastic material calculated based on the above Equation 1 was about 10 weight %.

Buffer Layer Preparing Example 11

Using a double raschel machine, a three-dimensional structure was prepared, consisting of a front surface layer, A three-dimensional structure including a front surface layer, an intermediate layer, and a rear surface layer and having a thickness of 10 mm was prepared using double-raschel machine. The front surface layer, the intermediate layer, and the rear surface layer had thicknesses of 1 mm, 8 mm, and 1 mm, respectively.

The front surface layer and the rear surface layer were each formed of fibers having 50 weight % of 150 denier polyethylene terephthalate and 50 weight % of 250 denier polyethylene terephthalate. The intermediate layer was formed of polyethylene terephthalate fibers (mono yarn)

having a diameter of approximately 0.27 mm. The front surface layer was formed to have about 160,000 grid shapes per 1 m² and the rear surface layer was formed to haver about 47,500 honeycomb shapes per 1 m². In addition, densities of the front surface layer, the intermediate layer and the rear surface layer were about 0.22 g/cm³, 0.025 g/cm³ and 0.22 g/cm³, respectively.

After impregnating the prepared three-dimensional structure with polyurethane resin, it was dried at 80-100° C. for about 2 hours. The content of elastic material calculated based on the above Equation 1 was about 50 weight %.

Buffer Layer Preparing Example 12

A three-dimensional structure including a front surface layer, an intermediate layer, and a rear surface layer and having a thickness of 10 mm was prepared using double-raschel machine. The front surface layer, the intermediate layer, and the rear surface layer had thicknesses of 1 mm, 8 mm, and 1 mm, respectively.

The front surface layer and the rear surface layer were each formed of fibers having 50 weight % of 150 denier polyethylene terephthalate and 50 weight % of 250 denier polyethylene terephthalate. The intermediate layer was formed of polyethylene terephthalate fibers (mono yarn) having a diameter of approximately 0.27 mm. The front surface layer was formed to have about 160,000 grid shapes per 1 m² and the rear surface layer was formed to haver about 47,500 honeycomb shapes per 1 m². In addition, densities of the front surface layer, the intermediate layer and the rear surface layer were about 0.05 g/cm³, 0.01 g/cm³ and 0.05 g/cm³, respectively.

After impregnating the prepared three-dimensional structure with polyurethane resin, it was dried at 80-100° C. for about 2 hours. The content of elastic material calculated based on the above Equation 1 was about 30 weight %.

Buffer Layer Preparing Example 13

A three-dimensional structure including a front surface layer, an intermediate layer, and a rear surface layer and having a thickness of 10 mm was prepared using double-raschel machine. The front surface layer, the intermediate layer, and the rear surface layer had thicknesses of 1 mm, 8 mm, and 1 mm, respectively.

The front surface layer and the rear surface layer were each formed of fibers having 50 weight % of 150 denier polyethylene terephthalate and 50 weight % of 250 denier polyethylene terephthalate. The intermediate layer was formed of polyethylene terephthalate fibers (mono yarn) having a diameter of approximately 0.27 mm. The front surface layer was formed to have about 160,000 grid shapes per 1 m² and the rear surface layer was formed to haver about 47,500 honeycomb shapes per 1 m². In addition, densities of the front surface layer, the intermediate layer and the rear surface layer were about 0.4 g/cm³, 0.1 g/cm³ and 0.4 g/cm³, respectively.

After impregnating the prepared three-dimensional structure with polyurethane resin, it was dried at 80-100° C. for about 2 hours. The content of elastic material calculated based on the above Equation 1 was about 30 weight %.

Buffer Layer Preparing Example 14

A three-dimensional structure including a front surface layer, an intermediate layer, and a rear surface layer and having a thickness of 10 mm was prepared using double-raschel machine. The front surface layer, the intermediate layer, and the rear surface layer had thicknesses of 1 mm, 8 mm, and 1 mm, respectively. The prepared three-dimensional structure was heated at about 150° C. using a steam dryer at a speed of about 3 m/min for 20 seconds to prepare the buffer layer.

The front surface layer and the rear surface layer were each formed of fibers having 50 weight % of 150 denier polyethylene terephthalate and 50 weight % of 250 denier polyethylene terephthalate. The intermediate layer was formed of polyethylene terephthalate fibers (mono yarn) having a diameter of approximately 0.27 mm. The front surface layer was formed to have about 160,000 grid shapes per 1 m² and the rear surface layer was formed to haver about 47,500 honeycomb shapes per 1 m². In addition, weights per unit area of the front surface layer, the intermediate layer and the rear surface layer were about 300 g/m², 2,000 g/m² and 450 g/m², respectively.

Buffer Layer Preparing Example 15

The buffer layer was prepared in the same manner as Buffer Layer Preparing Example 14, except that the heating temperature of the three-dimensional structure was changed to 130° C.

Buffer Layer Preparing Example 16

The buffer layer was prepared in the same manner as Buffer Layer Preparing Example 14, except that the heating temperature of the three-dimensional structure was changed to 170° C.

Buffer Layer Comparative Preparing Example 1

The buffer layer was prepared in the same manner as Buffer Layer Preparing Example 1, except that the denier of the polyethylene terephthalate of the first yarn consisting the front surface layer and the rear surface layer, was changed to 100.

Buffer Layer Comparative Preparing Example 2

The buffer layer was prepared in the same manner as Buffer Layer Preparing Example 1, except that the denier of the polyethylene terephthalate of the first yarn and the second yarn were changed to 100 and 300, respectively. The first yarn and the second yarn formed the front surface layer and the rear surface layer.

Buffer Layer Comparative Preparing Example 3

The buffer layer was prepared in the same manner as Buffer Layer Preparing Example 1, except that the denier of the polyethylene terephthalate of the first yarn and the second yarn were changed to 100 and 750, respectively. The first yarn and the second yarn formed the front surface layer and the rear surface layer.

Buffer Layer Comparative Preparing Example 4

The buffer layer was prepared in the same manner as Buffer Layer Preparing Example 1, except that the denier of the polyethylene terephthalate of the first yarn consisting of the front surface layer and the rear surface layer, was changed to 450.

Buffer Layer Comparative Preparing Example 5

The buffer layer was prepared in the same manner as Buffer Layer Preparing Example 1, except that the denier of the polyethylene terephthalate of the first yarn and the second yarn were changed to 450 and 300, respectively. The first yarn and the second yarn formed the front surface layer and the rear surface layer.

Buffer Layer Comparative Preparing Example 6

The buffer layer was prepared in the same manner as Buffer Layer Preparing Example 1, except that the denier of the polyethylene terephthalate of the first yarn and the second yarn were changed to 450 and 750, respectively. The first yarn and the second yarn formed the front surface layer and the rear surface layer.

Buffer Layer Comparative Preparing Example 7

The buffer layer was prepared in the same manner as Buffer Layer Preparing Example 1, except that the denier of the polyethylene terephthalate of the first yarn, the second yarn and the third yarn were changed to 400, 750 and 150, respectively. The first yarn and the second yarn formed the front surface layer and the rear surface layer, and the third yarn (mono yarn) formed the intermediate layer.

Buffer Layer Comparative Preparing Example 8

The buffer layer was prepared in the same manner as Buffer Layer Preparing Example 8, except that both the front surface layer and the rear surface layer were formed of grid shapes.

Buffer Layer Comparative Preparing Example 9

The buffer layer was prepared in the same manner as Buffer Layer Preparing Example 8, except that both the front surface layer and the rear surface layer were formed of honeycomb shapes.

Buffer Layer Comparative Preparing Example 10

A three-dimensional structure including a front surface layer, an intermediate layer, and a rear surface layer and having a thickness of 10 mm was prepared using double-raschel machine. The front surface layer, the intermediate layer, and the rear surface layer had thicknesses of 1 mm, 8 mm, and 1 mm, respectively.

The front surface layer and the rear surface layer were each formed of fibers having 50 weight % of 150 denier polyethylene terephthalate and 50 weight % of 250 denier polyethylene terephthalate. The intermediate layer was formed of polyethylene terephthalate fibers (mono yarn) having a diameter of approximately 0.27 mm. The front surface layer was formed to have about 160,000 grid shapes per 1 m² and the rear surface layer was formed to haver about 47,500 honeycomb shapes per 1 m². In addition, densities of the front surface layer, the intermediate layer and the rear surface layer were about 0.22 g/cm³, 0.025 g/cm³ and 0.22 g/cm³, respectively.

Buffer Layer Comparative Preparing Example 11

A three-dimensional structure including a front surface layer, an intermediate layer, and a rear surface layer and having a thickness of 10 mm was prepared using double-raschel machine. The front surface layer, the intermediate layer, and the rear surface layer had thicknesses of 1 mm, 8 mm, and 1 mm, respectively.

The front surface layer and the rear surface layer were each formed of fibers having 50 weight % of 150 denier polyethylene terephthalate and 50 weight % of 250 denier polyethylene terephthalate. The intermediate layer was formed of polyethylene terephthalate fibers (mono yarn) having a diameter of approximately 0.27 mm. The front surface layer was formed to have about 160,000 grid shapes per 1 m² and the rear surface layer was formed to haver about 47,500 honeycomb shapes per 1 m². In addition, densities of the front surface layer, the intermediate layer and the rear surface layer were about 0.22 g/cm³, 0.025 g/cm³ and 0.22 g/cm³, respectively.

After impregnating the prepared three-dimensional structure with polyurethane resin, it was dried at 80-100° C. for about 2 hours. The content of elastic material calculated based on the above Equation 1 was about 5 weight %.

Buffer Layer Comparative Preparing Example 12

A three-dimensional structure including a front surface layer, an intermediate layer, and a rear surface layer and having a thickness of 10 mm was prepared using double-raschel machine. The front surface layer, the intermediate layer, and the rear surface layer had thicknesses of 1 mm, 8 mm, and 1 mm, respectively.

The front surface layer and the rear surface layer were each formed of fibers having 50 weight % of 150 denier polyethylene terephthalate and 50 weight % of 250 denier polyethylene terephthalate. The intermediate layer was formed of polyethylene terephthalate fibers (mono yarn) having a diameter of approximately 0.27 mm. The front surface layer was formed to have about 160,000 grid shapes per 1 m² and the rear surface layer was formed to haver about 47,500 honeycomb shapes per 1 m². In addition, densities of the front surface layer, the intermediate layer and the rear surface layer were about 0.22 g/cm³, 0.025 g/cm³ and 0.22 g/cm³, respectively.

After impregnating the prepared three-dimensional structure with polyurethane resin, it was dried at 80-100° C. for about 2 hours. The content of elastic material calculated based on the above Equation 1 was about 70 weight %.

Buffer Layer Comparative Preparing Example 13

The buffer layer was prepared in the same manner as Buffer Layer Preparing Example 14, except that the heating temperature of the three-dimensional structure was changed to 100° C.

Buffer Layer Comparative Preparing Example 14

The buffer layer was prepared in the same manner as Buffer Layer Preparing Example 14, except that the heating temperature of the three-dimensional structure was changed to 200° C.

Buffer Layer Comparative Preparing Example 15

The buffer layer was prepared in the same manner as Buffer Layer Preparing Example 14, except that the heating rate of the three-dimensional structure was changed to 0.5 m/min.

Buffer Layer Comparative Preparing Example 16

The buffer layer was prepared in the same manner as Buffer Layer Preparing Example 14, except that the heating rate of the three-dimensional structure was changed to 7 m/min.

Buffer Layer Comparative Preparing Example 17

The buffer layer was prepared in the same manner as Buffer Layer Preparing Example 14, except that the three-dimensional structure was not heated.

Pile Yarn Preparing Example 1

A polymer mixture is prepared by adding 100 parts by weight of polyethylene with a density of 0.942 $g/cm^3$, a molecular weight of 220,000 and a molecular weight distribution (Mw/Mn) of 20, 1.25 parts by weight of maleic anhydride as a compatibilizer, 6.25 parts by weight of pigment, and 0.5 parts by weight of a flame retardant. The prepared mixture was heated to prepare a mixed melt, and the prepared mixed melt was extruded to produce a first pile yarn. The fineness of the pile yarn was about 1,200 denier.

Table 1 below is a table listing the denier of the first, second, and third yarns and the shapes of the front and rear surface layers in Buffer Layer Preparing Examples 1 to 8 and Buffer Layer Comparative Preparing Examples 1 to 9.

structure was prepared by heating a structure with those layers at about 160° C. for 20 seconds at a speed of about 3 m/min using a surface heat-fusion equipment. The compositions of the protective layer and the buffer layer are shown in Table 2 below.

TABLE 2

| Category | Protective Layer | Buffer Layer |
|---|---|---|
| Example 1 | Used | Preparing Example 1 |
| Example 2 | Used | Preparing Example 2 |
| Example 3 | Used | Preparing Example 3 |
| Example 4 | Used | Preparing Example 4 |
| Example 5 | Used | Preparing Example 5 |
| Example 6 | Used | Preparing Example 6 |
| Example 7 | Used | Preparing Example 7 |
| Example 8 | Used | Preparing Example 8 |
| Comparative Example 1 | Used | Comparative Preparing Example 1 |
| Comparative Example 2 | Used | Comparative Preparing Example 2 |
| Comparative Example 3 | Used | Comparative Preparing Example 3 |
| Comparative Example 4 | Used | Comparative Preparing Example 4 |
| Comparative Example 5 | Used | Comparative Preparing Example 5 |
| Comparative Example 6 | Used | Comparative Preparing Example 6 |
| Comparative Example 7 | Used | Comparative Preparing Example 7 |
| Comparative Example 8 | Used | Comparative Preparing Example 8 |
| Comparative Example 9 | Used | Comparative Preparing Example 9 |
| Comparative Example 10 | Not Used | Preparing Example 8 |

TABLE 1

| Category | First Yarn (Denier) | Third Yarn (Denier) | Second Yarn (Denier) | Shape of Front Surface Layer | Shape of Rear Surface Layer |
|---|---|---|---|---|---|
| Preparing Example 1 | 150 | 210 | 250 | Grid | Honeycomb |
| Preparing Example 2 | 150 | 210 | 300 | Grid | Honeycomb |
| Preparing Example 3 | 150 | 210 | 750 | Grid | Honeycomb |
| Preparing Example 4 | 400 | 210 | 250 | Grid | Honeycomb |
| Preparing Example 5 | 400 | 210 | 300 | Grid | Honeycomb |
| Preparing Example 6 | 400 | 210 | 750 | Grid | Honeycomb |
| Preparing Example 7 | 400 | 450 | 750 | Grid | Honeycomb |
| Preparing Example 8 | 400 | 750 | 750 | Grid | Honeycomb |
| Comparative Preparing Example 1 | 100 | 210 | 250 | Grid | Honeycomb |
| Comparative Preparing Example 2 | 100 | 210 | 300 | Grid | Honeycomb |
| Comparative Preparing Example 3 | 100 | 210 | 750 | Grid | Honeycomb |
| Comparative Preparing Example 4 | 450 | 210 | 250 | Grid | Honeycomb |
| Comparative Preparing Example 5 | 450 | 210 | 300 | Grid | Honeycomb |
| Comparative Preparing Example 6 | 450 | 210 | 750 | Grid | Honeycomb |
| Comparative Preparing Example 7 | 400 | 150 | 750 | Grid | Honeycomb |
| Comparative Preparing Example 8 | 400 | 750 | 750 | Grid | Grid |
| Comparative Preparing Example 9 | 400 | 750 | 750 | Honeycomb | Honeycomb |

Examples 1 to 8 and Comparative Examples 1 to 10

A protective layer was prepared using polypropylene woven fabric having a thickness of approximately 1.25 mm.

In addition, a bubble layer and a backing layer were prepared using polyethylene terephthalate non-woven fabric having a thickness of approximately 0.75 mm.

After placing the protective layer, the buffer layer and the bubble layer, and tufting a first pile yarn, placing the backing layer on a bottom of the bubble layer, and an artificial turf Experimental Example 1

To determine whether a front surface layer and a rear surface layer are damaged during tufting based on deniers of yarns constituting the front surface layer and rear surface layer and measure through-loads of a needle during the tufting, the prepared artificial turf structures in Examples 1 to 6 and Comparative Examples 1 to 6 were measured using the following measurement methods, and results thereof are listed in Table 3.

[Measurement Method]

Whether Front and Rear surface layers are Damaged: Visually check whether yarns had burst and pattern shapes had changed.

⊚: After tufting, there was no changes in yarns and pattern shapes of the front surface layer or the rear surface layer.

○: After tufting, there was no changes in yarns and some changes in pattern shape of the front surface layer or the rear surface layer.

X: After tufting, in the front surface layer and the rear surface layer, there are some yarns that had burst and pattern shapes had change.

Through-Load: Visually check whether sagging of yarns occur.

⊚: During tufting, continuous work is possible without difficulty.

○: During tufting, continuous work is possible, but additional work to fix yarns is required due to sagging of some yarns.

X: During tufting, it is difficult to penetrate through the needle, which causes an equipment load.

TABLE 3

| Category | Whether Front and Rear Surface Layers are Damaged | Through-Load |
|---|---|---|
| Example 1 | ○ | ⊚ |
| Example 2 | ○ | ⊚ |
| Example 3 | ⊚ | ○ |
| Example 4 | ⊚ | ○ |
| Example 5 | ⊚ | ○ |
| Example 6 | ⊚ | ⊚ |
| Comparative Example 1 | X | ⊚ |
| Comparative Example 2 | X | ⊚ |
| Comparative Example 3 | X | ⊚ |
| Comparative Example 4 | ⊚ | X |
| Comparative Example 5 | ⊚ | X |
| Comparative Example 6 | ○ | X |

From Table 3, it can be seen that when the deniers of the first yarns constituting the front surface layer and the rear surface layer are 100 (Comparative Examples 1 to 3), the front surface layer and the rear surface layer are damaged during tufting and when the deniers of the first yarns constituting the front surface layer and the rear surface layer are 450 (Comparative Examples 4 to 6), it is difficult to perform tufting due to a high through-load during the tufting.

On the other hand, when the deniers of the first yarns constituting the front surface layer and the rear surface layer are 150 or 400 (Examples 1 to 6), there is no damage to the front surface layer and the rear surface layer, and it can be confirmed that the penetrating load during tufting is low, so tufting is easy.

Experimental Example 2

In order to measure a permanent compression rate according to denier of a third yarn (mono yarn) constituting an intermediate layer, the prepared artificial turf structures in Examples 6 to 8 and Comparative Example 7 were measured using the following measurement methods, and results thereof are listed in Table 4.

[Measurement Method]

Permanent Compression Rate: Apply a certain load (1.8 kN) to a sample for about 22 hours, recover the sample for about 48 hours, and measure permanent compression rate through changes in thickness.

TABLE 4

| Category | Permanent Compression Rate (%) |
|---|---|
| Example 6 | 42 |
| Example 7 | 38 |
| Example 8 | 36 |
| Comparative Example 7 | 60 |

From Table 4 above, it can be seen that when the denier of the third yarn (mono yarn) constituting the intermediate layer is 150 (Comparative Example 7), the permanent compression rate is 60% or more, which is not good, but when the deniers of the third yarn (mono yarn) are 210, 450, or 750 (Examples 6 to 8), the permanent compression rate is 45% or less.

Experimental Example 3

In order to measure a shock-absorbing rate, a vertical deformation and a through-load, according to shapes of the front surface layer and rear surface layer, the prepared artificial turf structures in Example 8 and Comparative Examples 8 to 9 were measured using the following measurement method, and results thereof are listed in Table 5.

[Measurement Method]

Shock-Absorbing Rate and Vertical Deformation: Measure the shock-absorbing rate and vertical deformation values of samples at least three times using a field tester, and calculate an average value from the remaining values after excluding the first measured value.

Through-Load: Visually check whether sagging of yarns occur.

⊚: During tufting, continuous work is possible without difficulty.

○: During tufting, continuous work is possible, but additional work to fix yarns is required due to sagging of some yarns.

X: During tufting, it is difficult to penetrate through the needle, which causes an equipment load.

TABLE 5

| Category | Shock-Absorbing Rate (%) | Vertical Deformation (mm) | Penetration Load |
|---|---|---|---|
| Example 8 | 52 | 9 | ⊚ |
| Comparative Example 8 | 47 | 7 | X |
| Comparative Example 9 | 55 | 13 | ⊚ |

From Table 5, it can be seen that when the shapes of the front surface layer and rear surface layer are a grid and a honeycomb (Example 8), the shock-absorbing rate is more than 50%, the vertical deformation is 9 mm, which satisfies the Korean Industrial Standards (KS), and the through-load is low, it is easy to perform tufting.

On the other hand, it can be seen that when each of the shapes of the front surface layer and the rear surface layer is a grid (Comparative Example 8), the shock-absorbing rate is 47% and does not satisfy the standards from KS, the through-load is high so that it is difficult to perform tufting, and when each of the shapes of the front surface layer and the rear surface layer is a honeycomb (Comparative Example 9), it can be confirmed that the vertical deformation is 13 mm, which does not satisfy the standards from KS.

Experimental Example 4

In order to measure a shock-absorbing rate, a vertical deformation and a through-load, according to presence or absence of a protective layer, the prepared artificial turf structures in Example 8 and Comparative Examples 8 to 9 were measured using the following measurement method, and results thereof are listed in Table 6.

[Measurement Method]

Shock-Absorbing Rate and Vertical Deformation: Measure the shock-absorbing rate and vertical deformation values of samples at least three times using a field tester, and calculate an average value from the remaining values after excluding the first measured value.

Through-Load: Visually check whether sagging of yarns occur.

◎: During tufting, continuous work is possible without difficulty.

○: During tufting, continuous work is possible, but additional work to fix yarns is required due to sagging of some yarns.

X: During tufting, it is difficult to penetrate through the needle, which causes an equipment load.

TABLE 6

| Category | Shock-Absorbing Rate (%) | Vertical Deformation (mm) | Penetration Load |
|---|---|---|---|
| Example 8 | 52 | 9 | ◎ |
| Comparative Example 10 | 41.4 | 13.2 | ◎ |

It can be seen that in the case without the protective layer (Comparative Example 10), the shock-absorbing rate and the vertical deformation value were reduced compared to the case with the protective layer (Example 8).

Examples 9 to 13 and Comparative Examples 11 to 13

A protective layer was prepared using polypropylene woven fabric having a thickness of approximately 0.45 mm. A bubble layer and A backing layer were prepared using polyethylene terephthalate non-woven fabric having a thickness of approximately 0.45 mm.

After placing the protective layer, the buffer layer and the bubble layer, and tufting a first pile yarn, placing the backing layer on a bottom of the bubble layer, and an artificial turf structure was prepared by heating a structure with those layers at about 160° C. for 20 seconds at a speed of about 3 m/min using a surface heat-fusion equipment. The compositions of the protective layer are shown in Table 7 below.

TABLE 7

| Category | Buffer Layer |
|---|---|
| Example 9 | Preparing Example 9 |
| Example 10 | Preparing Example 10 |
| Example 11 | Preparing Example 11 |
| Example 12 | Preparing Example 12 |
| Example 13 | Preparing Example 13 |
| Comparative Example 11 | Comparative Preparing Example 10 |
| Comparative Example 12 | Comparative Preparing Example 11 |
| Comparative Example 13 | Comparative Preparing Example 12 |

Experimental Example 5

The prepared artificial turf structures in Examples 9 to 13 and Comparative Examples 11 to 13 were measured using the following measurement method, and results thereof are listed in Table 8.

[Measurement Method]

Shock-Absorbing Rate: Measure shock-absorbing property of mat test pieces according to KS F 3888-1: 2022 standard.

Permanent Compression Rate: Apply a certain load (1.8 kN) to a sample for about 22 hours, recover the sample for about 48 hours, and measure permanent compression rate through changes in thickness.

TABLE 8

| Category | Content of Elastic Material (Weight %) | Shock-Absorbing Rate (%) | Permanent Compression Rate (%) |
|---|---|---|---|
| Example 9 | 30 | 62 | 16 |
| Example 10 | 10 | 54 | 22 |
| Example 11 | 50 | 55 | 15 |
| Example 12 | 30 | 54 | 24 |
| Example 13 | 30 | 51 | 14 |
| Comparative Example 11 | 0 | 41 | 30 |
| Comparative Example 12 | 5 | 45 | 30 |
| Comparative Example 13 | 70 | 48 | 10 |

From Table 8, it can be seen that the case in which the elastic material was impregnated (Example 9) had both better shock-absorbing rate and permanent compression rate than the case in which the elastic material was not impregnated (Comparative Example 11).

On the other hand, it can be seen that in terms of the elastic material content, the case of 10 to 50 weight % (Examples 9 to 11) had both better shock-absorbing rate and permanent compression rate than the case of 5 weight % (Comparative Example 12) and the case of 70 weight % (Comparative Example 13).

In addition, it can be seen that when a substrate of the buffer layer is a double-raschel knitted fabric, the case in which densities of the front surface layer, the intermediate layer and the rear surface layer are about 0.22 g/cm$^3$, about 0.025 g/cm$^3$, and about 0.22 g/cm$^3$, respectively (Example 9) had both better shock-absorbing rate and permanent compression rate than the case in which the densities are lower than the above numerical range (Example 12) or the case in which the densities are higher than the above numerical range (Example 13).

Examples 14 to 16 and Comparative Examples 14 to 19

A protective layer was prepared using polypropylene woven fabric having a thickness of approximately 0.45 mm. A bubble layer and A backing layer were prepared using polyethylene terephthalate non-woven fabric having a thickness of approximately 0.45 mm.

After placing the protective layer, the buffer layer and the bubble layer, and tufting a first pile yarn, placing the backing layer on a bottom of the bubble layer, and an artificial turf structure was prepared by heating a structure with those layers at about 160° C. for 20 seconds at a speed of about 3 m/min using a surface heat-fusion equipment. The compositions of the protective layer are shown in Table 9 below.

TABLE 9

| Category | Protective Layer | Buffer Layer |
|---|---|---|
| Example 14 | Used | Preparing Example 1 |
| Example 15 | Used | Preparing Example 2 |

TABLE 9-continued

| Category | Protective Layer | Buffer Layer |
|---|---|---|
| Example 16 | Used | Preparing Example 3 |
| Comparative Example 14 | Used | Comparative Preparing Example 1 |
| Comparative Example 15 | Used | Comparative Preparing Example 2 |
| Comparative Example 16 | Used | Comparative Preparing Example 3 |
| Comparative Example 17 | Used | Comparative Preparing Example 4 |
| Comparative Example 18 | Used | Comparative Preparing Example 5 |
| Comparative Example 19 | Not Used | Preparing Example 1 |

Comparative Example 20

An artificial turf structure was prepared in the same manner as Example 14, except that the heating temperature was changed to about 100° C.

Comparative Example 21

An artificial turf structure was prepared in the same manner as Example 14, except that the heating temperature was changed to about 200° C.

Experimental Example 6

The prepared artificial turf structures in Examples 14 to 16 and Comparative Examples 14 to 21 were measured using the following measurement method, and results thereof are listed in Table 10.

[Measurement Method]

Shock-Absorbing Rate: Measure shock-absorbing property of mat test pieces according to KS F 3888-1: 2022 standard.

Permanent Compression Rate: Apply a certain load (1.8 kN) to a sample for about 22 hours, recover the sample for about 48 hours, and measure permanent compression rate through changes in thickness.

TABLE 10

| Category | Shock-Absorbing Rate (%) | Permanent Compression Rate (%) |
|---|---|---|
| Example 14 | 58 | 22 |
| Example 15 | 56 | 23 |
| Example 16 | 57 | 23 |
| Comparative Example 14 | 49 | 41 |
| Comparative Example 15 | 56 | 38 |
| Comparative Example 16 | 55 | 37 |
| Comparative Example 17 | 49 | 42 |
| Comparative Example 18 | 47 | 43 |
| Comparative Example 19 | 41 | 31 |
| Comparative Example 20 | 51 | 42 |
| Comparative Example 21 | 56 | 39 |

From Table 10, it can be seen that when the heating temperature, the heating speed and the heating time for the buffer layer are 130 to 170° C., about 3 m/min and 20 seconds, and the heating temperature, the heating speed and the heating time for the backing layer are 160° C., about 3 m/min and 20 seconds (Examples 14 to 16), the shock-absorbing rate was 56 to 58% and the permanent compression rate was 23 to 23%, which were significantly improved.

On the other hand, it can be seen that when the heating temperature of the buffer layer is lower than in Examples 14 to 16 (Comparative Example 14), the shock-absorbing rate is low and the permanent compression rate is 41%, which was significantly low, due to poor bonding of the buffer layer, and when the heating temperature of the buffer layer was higher than in Examples 14 to 16 (Comparative Example 15), that the shock-absorbing rate was high, but the permanent compression rate was 38%, which is low, because the bonding has been excessively performed.

In addition, it can be seen that when the heating speed of the buffer layer is lower than in Examples 14 to 16 (Comparative Example 16), the shock-absorbing rate is high but the permanent compression rate is 37%, which was low, because the bonding has been excessively performed, and when the heating speed of the buffer layer was higher than in Examples 14 to 16 (Comparative Example 17), the shock-absorbing rate was low and the permanent compression rate was 42%, which was low, due to poor bonding of the buffer layer.

In addition, it can be seen that when the buffer layer is not heated compared to Examples 14 to 16 (Comparative Example 18), both the shock-absorbing rate and the permanent compression rate are low.

In addition, it can be seen that compared to Examples 14 to 16, when there was no protective layer (Comparative Example 19), the shock-absorbing rate was significantly low because silica sand and a filling material permeated into the buffer layer.

In addition, it can be seen that when heating temperature of the backing layer was lower than that in Examples 14 to 16 (Comparative Example 20), the permanent compression rate was low due to poor bonding, and when heating temperature of the backing layer was higher than that in Examples 14 to 16 (Comparative Example 21), the shock-absorbing rate was high but the permanent compression rate was 39%, which was low, because the bonding has been excessively performed.

As set forth above, according to example embodiments, an artificial turf structure may include a protective layer to prevent foreign objects from entering a buffer layer, thereby maintaining the high shock-absorbing performance of the artificial turf structure for a long period of time.

In addition, a front surface layer and a rear surface layer of the buffer layer may each exhibit improved shock-absorbing performance with their specific shapes.

In addition, yarn constituting a front surface layer, an intermediate layer, and a rear surface layer may exhibit improved shock-absorbing performance with having a specific fineness.

What is claimed is:

1. An artificial turf structure, consisting of:

a protective layer;

a buffer layer disposed on a lower surface of the protective layer and having a three-dimensional structure comprising a front surface layer, an intermediate layer and a rear surface layer;

a bubble layer disposed on a lower surface of the buffer layer;

a pile unit tufted to the protective layer, the buffer layer and the bubble layer; and a backing layer disposed on a lower surface of the bubble layer and preventing the pile unit from leaving;

wherein the front surface layer has a plurality of grid shapes, and the rear surface layer has a plurality of honeycomb shapes, and wherein the number of the plurality of grid shapes per 1 $m^2$ is 120,000 to 200,000, and the number of the plurality of honeycomb shapes per 1 $m^2$ is 35,000 to 60,000.

2. The artificial turf structure of claim 1, wherein the protective layer is formed of woven fabric, non-woven fabric or film, and has a thickness of 0.4 to 1.2 millimeters (mm).

3. The artificial turf structure of claim 1, wherein the front surface layer and the rear surface layer, which are provided to protect the intermediate layer from damage caused by external force, are formed of a first yarn having a fineness of 150 to 400 denier and a second yarn having a fineness of 250 to 750 denier, respectively;

wherein the front surface layer and the rear surface layer include 45 to 55 weight % of the first yarn and 45 to 55% weight of the second yarn.

4. The artificial turf structure of claim 1, wherein the intermediate layer connects the front surface layer and the rear surface layer to each other, and is formed of a mono yarn having a fitness of 210 to 800 denier, wherein the buffer layer is impregnated with an elastic material and the content of the elastic material impregnated in the buffer layer is 20 to 40% weight, based on the total weight % of the buffer layer.

5. The artificial turf structure of claim 1, wherein the buffer layer has a thickness of 5 to 12 mm.

6. The artificial turf structure of claim 1, wherein the pile unit comprises a portion exposed onto a surface of the protective layer, and the exposed portion has a length of 30 to 55 mm.

\* \* \* \* \*